(12) United States Patent
Charles

(10) Patent No.: US 7,295,451 B2
(45) Date of Patent: Nov. 13, 2007

(54) SWITCHING POWER SUPPLY HAVING DUAL CURRENT FEEDBACK

(75) Inventor: Donald E. Charles, Wauconda, IL (US)

(73) Assignee: Siemens Building Technologies, Inc.

( * ) Notice: Subject to any disclaimer, the term of this patent is extended or adjusted under 35 U.S.C. 154(b) by 0 days.

(21) Appl. No.: 11/375,884

(22) Filed: Mar. 15, 2006

(65) Prior Publication Data

US 2007/0217230 A1    Sep. 20, 2007

(51) Int. Cl.
*H02M 3/335* (2006.01)
*H02M 7/537* (2006.01)

(52) U.S. Cl. ............................. 363/21.15; 363/21.17; 363/97

(58) Field of Classification Search ............. 363/21.01, 363/21.07, 21.09, 21.15, 21.17, 21.18, 97, 363/131
See application file for complete search history.

(56) References Cited

U.S. PATENT DOCUMENTS 6,134,122 A * 10/2000 Chen et al. .................... 307/58
6,577,512 B2 * 6/2003 Tripathi et al. ............ 363/21.17

* cited by examiner

*Primary Examiner*—Gary L Laxton

(57) ABSTRACT

An arrangement for use in a switching power supply includes a power supply output line, a current sensing circuit, and a feedback circuit. The output line is operably coupled to an output winding of a transformer. The transformer has a first winding operably connected to a switching device configured to be switched in accordance with a first control signal. The current sensing circuit is operable to generate a current signal that is representative of current on the output line. The feedback circuit is operable to generate a feedback signal as a function of the current on the output line. The feedback signal has a first relationship with respect to the current when the current is below a threshold, and has a second relationship with respect to the current when the current is above the threshold.

20 Claims, 6 Drawing Sheets

SWITCHING POWER SUPPLY HAVING DUAL CURRENT FEEDBACK

FIELD OF THE INVENTION

The present invention relates generally to power conversion, and in particular, to a switching power supply having a DC output voltage.

BACKGROUND OF THE INVENTION

Most electronic devices employ circuits that do not directly obtain operating power from mains AC electrical power. Instead, electronic devices often require one or more DC supply or bias voltages. In order to generate a regulated DC voltage derived from an AC power source, switching converters are often used. In one common embodiment of a switching converter power supply, an AC input voltage is rectified to a first DC voltage level, which is in turn converted to an output DC voltage level. A DC-DC converter circuit performs the function of converting the first DC voltage level to the output DC voltage level.

There exist a number of different DC-DC converter architectures. A typical DC-DC converter design employs a semiconductor switch in line with the input voltage that is turned on and off at a relatively high frequency (compared to the frequency of mains AC voltage). The high frequency switched signal passes through the primary winding of a transformer. The transformer is configured such that the output winding provides an output signal level that corresponds to the desired output DC voltage level. The output winding of the transformer is coupled to a rectifier circuit that converts the output signal to DC.

In order to regulate the output of the DC-DC converter, various feedback signals can be used. The feedback signal may be used by control circuitry to alter the operation of the high frequency switching device. By way of example, the output voltage may be used as a feedback signal. In general, if the feedback signal indicates that the output voltage is too low, presumably due to heavy loading, then the control circuitry may increase the duty cycle of the switched signal generated by switching device, which increases the power provided through the transformer to the output signal.

In some systems, multiple power supplies are used in parallel. Such systems can include modular equipment systems in which differing power needs are met by adding parallel supply modules. In particular, such modular equipment systems are typically designed such that different interchangeable modules may be combined in a variety of ways. The power consumption of the system depends on which modules are used in the system. Some configurations may require only one power supply while others may require multiple supplies.

One problem that arises with the use of parallel power supplies arises from differences in output voltage levels of the supplies. While parallel power supplies ideally have the same output voltage level, the output voltage levels in reality will typically differ slightly. When parallel supplies have different output levels, the supply with the higher output voltage typically provides the most current. In some cases, the imbalance of current between the two parallel supplies can be significant. This is undesirable because one supply will run at full load (hot and stressed) while the other will be nearly unused.

To avoid problems caused by heavily imbalanced current draw on parallel power supplies, it is known to provide a series resistor on each power supply output. While the resistor can help balance the current between the two supplies by increasing the output impedance, to make the supply look more like a current source rather than a voltage source, the output resistor consumes a significant amount of power, which leads to heat dissipation problems and inefficiencies.

Accordingly, there is a need for a power supply that is more amenable to being connected in parallel with a similar power supply that avoids problems due to current imbalance.

SUMMARY

At least some embodiments of the present invention address the above described needs, as well as others, by providing a power supply having dual characteristic current feedback. One current feedback characteristic is used to reduce the output voltage of the supply above a stated output current threshold. The other current feedback characteristic is used to more moderately adjust the voltage as a function of current such that the output voltage may approach the output voltage of one or more parallel-connected power supplies.

A first embodiment of the invention is an arrangement for use in a switching power supply that includes a power supply output line, a current sensing circuit, and a feedback circuit. The output line is operably coupled to an output winding of a transformer. The transformer has a first winding operably connected to a switching device configured to be switched in accordance with a first control signal. The current sensing circuit is operable to generate a current signal that is representative of current on the output line. The feedback circuit is operable to generate a feedback signal as a function of the current on the output line. The feedback signal has a first relationship with respect to the current when the current is below a threshold, and has a second relationship with respect to the current when the current is above the threshold.

A second embodiment of the invention is an arrangement for use in a switching power supply that includes an output line, a current sensing circuit, and first and second feedback circuits. The output line is operably coupled to an output winding of a transformer. The transformer has a first winding operably connected to a switching device that is configured to be switched in accordance with a first control signal. The current sensing circuit is operable to generate a current signal representative of the current on the output line. The first feedback circuit is operable to generate a first feedback signal dependent upon the current signal. The second feedback circuit operable to generate a second feedback signal dependent upon the current signal. The arrangement also includes a feedback line operably coupled to receive the first feedback signal and the second feedback signal and generate a current feedback signal based thereon. The feedback line is configured to be coupled to a control circuit that generates the first control signal.

Some embodiments of the invention provide additional advantages as a result of the dual slope V/I characteristics. While the first slope provides modest adjustments for balancing parallel supplies, the second slope provides a more aggressive adjustment and allows the power supply to be monitored by other systems using the output voltage level. In particular, if a power supply is operating deep on the second slope (i.e. provides an output voltage significantly below the nominal output voltage), an external control systems can determine that there is very little reserve capacity with the supply. Such information can be useful in a modular system in order to identify whether an additional parallel supply is required, or whether there is a system malfunction.

The above described features and advantages, as well as others, will become more readily apparent to those of ordinary skill in the art by reference to the following detailed description and accompanying drawings.

DETAILED DESCRIPTION

Figure 1:
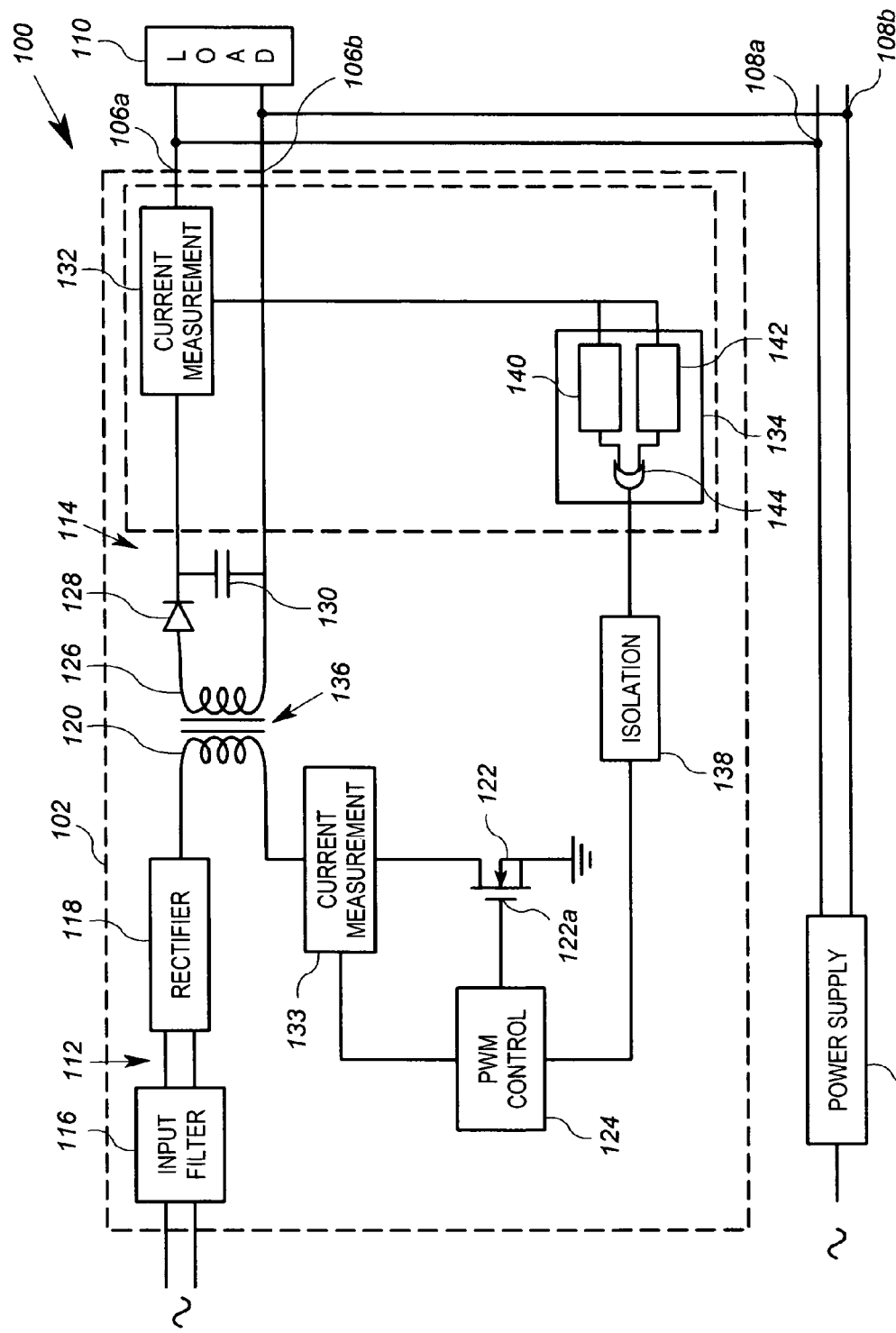
FIG. 1 shows parallel connected power supplies in accordance with embodiments of the present invention.

FIG. 1 shows a parallel power supply arrangement 100 according to embodiments of the invention. The power supply arrangement 100 includes a first power supply 102 and second power supply 104 connected in parallel. In particular, the first power supply 102 includes output terminals 106a, 106b that are connected to output terminals 108a, 108b of the second power supply. The output terminals 106a, 106b are coupled across a load 110, as are the output terminals 108a, 108b. Such a configuration may be used to provide power to a modular system in which power requirements can vary based on the number of modules employed. In such a case, the load 110 would represent the modular system.

The first power supply 102 includes an arrangement for adjusting its output voltage based on its output current, which is described herebelow. During operation, the first power supply 102 can adjust its output voltage level downward if the output current is relatively high. As discussed generally above, if the first power supply 102 has an output voltage level that exceeds the output voltage level of the second power supply 104, then most of the current required by the load 110 will be supplied by the first power supply 102. Because the first power supply 102 can adjust its output voltage level downward if the output current is too high, the first power supply 102 also reduces the proportion of current supplied to the load 110.

In general, the first power supply 102 includes a primary side circuit 112 and a secondary side circuit 114. The primary side circuit 112 includes an input filter 116, a rectifier circuit 118, a transformer primary winding 120, a switch 122, a pulse width modulation ("PWM") control circuit 124. The second side circuit 114 includes a transformer secondary winding 126, a diode 128, an output capacitor 130, a current measurement circuit 132, and a current feedback circuit 134. The transformer primary and secondary windings 120 and 126, respectively are part of a transformer 136. The first power supply 102 also includes a feedback isolation circuit 138.

Referring to the primary side circuit 112, the input filter 116 is operably coupled to receive an input AC power signal. The input filter 116 is configured to provide customary input power filtering, including, for example, voltage and/or current spike protection elements. The input filter 116 is operably coupled to provide the filtered AC power signal to the rectifier circuit 118. The rectifier circuit 118 is a circuit that converts the AC power signal into a rectified signal. The rectifier circuit 118 may suitably include a diode bridge rectifier or the like. The high rail output of the rectifier circuit 118 is operably coupled to a first terminal of the primary winding 120. The second terminal of the primary winding 120 is coupled to ground through the output terminals of the switch 122. The switch 122 may suitably be a high voltage MOSFET device. The above-described elements are known in the art and may take any suitable form The switch 122 includes a control terminal 122a operably coupled the PWM control circuit 124. The PWM control circuit 124 is a circuit that generates a relatively high frequency switching signal (e.g. 10 kHz and higher) that is pulse width modulated. The PWM control circuit 124 uses pulse width modulation in order to adjust the proportion of time that the switch 122 is in the on-state, as is known in the art. The PWM control circuit 124 adjusts the duty cycle (or "on time") of the PWM control signal as a function of feedback signal received from the feedback circuit 134 by way of the isolation element 138.

To this end, the control circuit 124 may suitably include a ramp generator and a comparator. In such a circuit the feedback signal is compared to a periodic ramp generator signal, and the output of the comparison is used as the control input for the switch 122. As a result, the switch 122 is turned on only when the ramp generator signal exceeds the feedback signal. Other PWM control circuits are known, and may include provision for taking into account other feedback signals in addition to those provided by the feedback circuit 134.

By way of example, the control circuit 124 also includes a current mode control operation. The current mode control operation is known in the art and is used to protect against drawing too much energy through the circuit. To provide current mode control, a current measurement circuit/device 133 sense the current through the switch 122 and provides a measure of the current to the control circuit 124, as is known in the art.

One suitable PWM control circuit 124 is the model UCC38C45 integrated circuit available from Texas Instruments.

Referring to the secondary side 114, the diode 128 is coupled to a first terminal of the secondary winding 126 to provide rectification of the AC signal appearing at the secondary winding. The output capacitor 130 is coupled between the output of the diode 128 and a second (ground) terminal of the secondary winding 126 to provide DC smoothing to the output signal. The DC output signal of the diode 128 and capacitor 130 represents the DC output signal of the power supply 102. This output signal propagates to the output 106a via the current measurement circuit 132.

The current measurement circuit 132 is operably coupled to obtain a measurement of the output current of the DC output signal. In the embodiment described herein, the current measurement circuit 132 is coupled between the output terminal 106a of the supply 102 and the junction of the diode 128 and the capacitor 130. The current measurement circuit 132 is a circuit that is configured to generate a current measurement signal. The current measurement signal is representative of the load current flowing to the output terminal 106a. Because the output signal is essentially a DC power signal, the current measurement signal is representative of the magnitude of the output current. The current measurement circuit 132 may take any suitable form, including a series resistor and terminals that obtain measurements of the voltage drop over the series resistor, such as is shown in the exemplary embodiment of FIG. 2. In any event, the current measurement circuit 132 is operably connected to provide the current measurement signal to the feedback circuit 134.

The feedback circuit 134 is operable to generate a feedback signal as a function of the output current, and in particular, as a function of the current measurement signal. In particular, the feedback circuit 134 is operable to generate the feedback signal such that it has a first relationship with respect to the output current when the output current is below a threshold, and a second relationship with respect to the output current when the output current is above the threshold. In the embodiment disclosed herein, the feedback circuit 134 is operable to generate the feedback signal such that it has a first output to input signal slope below the threshold, and a second output to input signal slope above the threshold. Thus, in the embodiment described herein, the feedback circuit 134 is operable to generate a feedback signal as a piece-wise linear function of the output current.

In the exemplary embodiment described herein, the feedback circuit 134 includes a first feedback circuit 140, a second feedback circuit 142, and a combiner 144. The combiner 144 in the exemplary embodiment performs a threshold-based wired-or operation on the outputs of the first and second feedback circuits 140 and 142, respectively. In particular, the outputs of each of the first feedback circuit 140 and the second feedback circuit 142 are wire-or'd, conditioned upon each of the outputs exceeding a minimum threshold.

Figure 3:
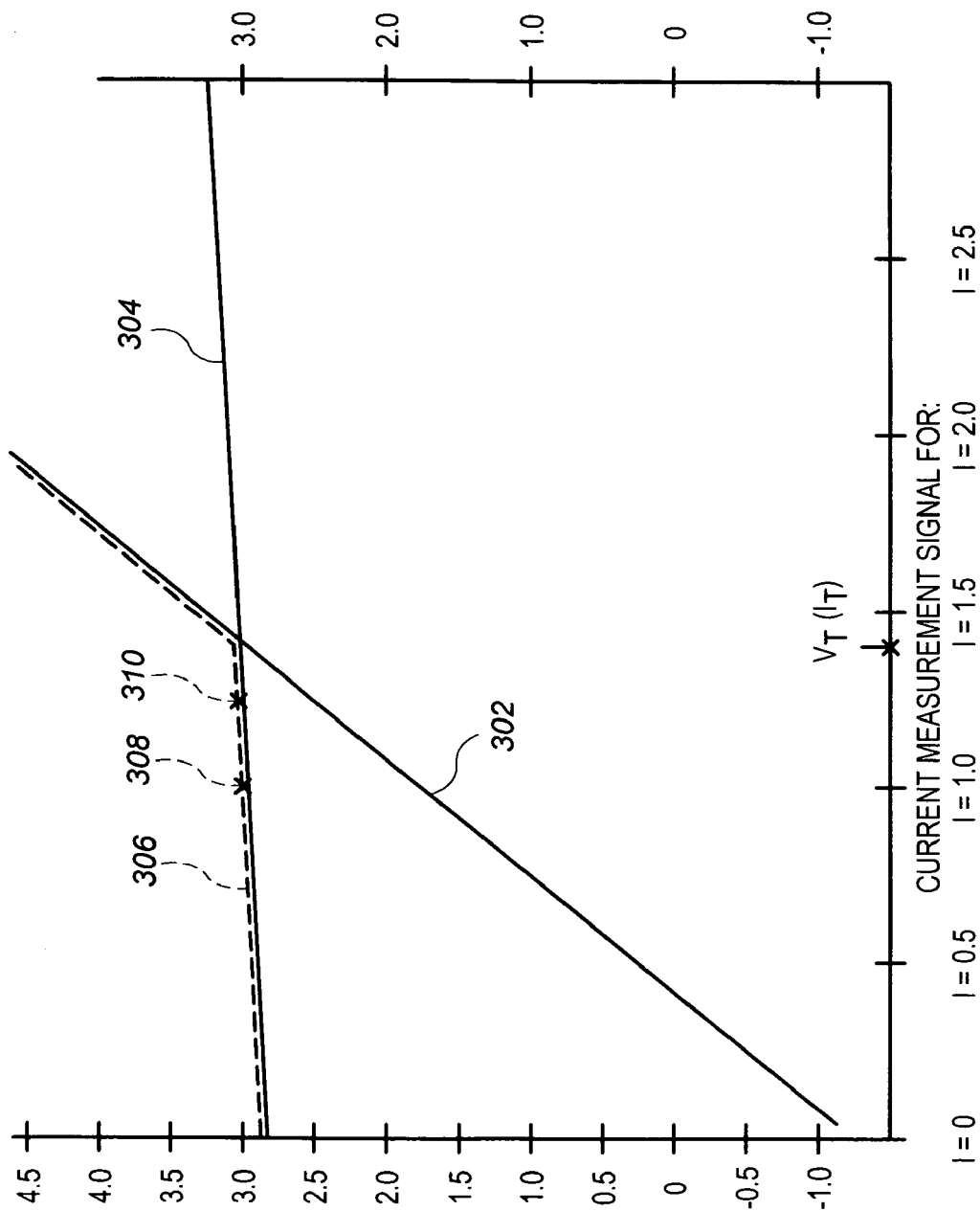
FIG. 3 shows feedback signal vs. current measurement signal curves produced by the arrangement of FIGS. 1 and 2.

In general, the first feedback circuit 140 is configured to generate an output (first feedback signal) as a function of the current measurement signal, the first function having a shallow slope. FIG. 3 shows an exemplary curve 302 of the output voltage of the first feedback circuit 140 as a function of the current measurement signal. The second feedback circuit 142 is similarly configured to generate an output (second feedback signal) as a second function of the current measurement signal, the second function having a shallower slope. FIG. 3 shows an exemplary curve 304 of the output voltage of the second feedback circuit 142 as a function of the current measurement signal voltage. For reasons that will be discussed below, the first feedback signal is biased such that it only exceeds the second feedback signal after the current measurement signal reaches a threshold (corresponding to a threshold output current $I_T$).

FIG. 3 also shows an exemplary curve 306 of the feedback signal voltage as a function of the current measurement signal. The curve 306 comprises a wired-or function of the curves 302 and 304. In other words, the curve 306 is essentially equal to the greater of the curve 302 or 304. It is noted that the curve 306 has two non-zero slopes, and is not merely a diode response type curve. This is important in at least some embodiments of the invention because it allows for output voltage adjustment using two different rates of adjustment, and not merely a single adjustment that is only performed once a threshold is reached.

Referring to FIG. 1, the feedback circuit 134 is operably connected to provide the feedback signal to the PWM control circuit 124 via an isolation element 138. The isolation element 138, which may suitably be an optical isolation element, is employed to ensure electrical isolation between the primary side circuit 112 and the secondary side circuit 114. As discussed above, the PWM control circuit 124 adjusts the duty cycle of the PWM signal responsive to the feedback signal. In the embodiment described herein, the proportion of the duty cycle is inversely proportional to the feedback signal. In other words, as the feedback signal increases, the PWM control circuit 124 generates a PWM signal having a decreasing "on time", thereby effectively decreasing the on time of the switch 122.

In at least some embodiments, voltage feedback from the secondary side circuit 114 may also be provided to the PWM control circuit 124 as is known in the art. While not shown in FIG. 1, resistors 270 and 272 provide such voltage feedback which is combined with the current feedback signal discussed below in connection with FIG. 2.

The power supply 104 may suitably have the same design as the power supply 102. The power supply 104 may also include a different power supply design intended to generate the same DC output voltage. However, one of the advantages of the embodiment described herein is that the power supply 102 (and 104) may be identical modules used in an expandable, modular system. Moreover, it will be noted that three or more power supplies may be connected in parallel using the technology of the present invention.

In operation, the power supplies 102 and 104 provide DC bias power to the load 110. Referring specifically to the power supply 102, the input filter 116 receives an AC power signal, which may suitably be a 120 volt AC signal, or a 24 volt AC signal used in HVAC systems. The rectifier 118 performs rectification such that the signal is generally DC in nature. This rectified signal is provided to the primary winding 120.

The PWM control circuit 124 meanwhile generates a PWM signal having a first "on time" duty cycle, and provides the PWM signal to the control terminal of the switch 122. During the on-times, the switch 122 conducts, allowing current to pass from the primary winding 120 to ground. During off times of the PWM signal, the switch 122 opens, opening the circuit between the primary winding 120 and ground. As a result, a periodic signal is passed through the primary winding. The periodic signal has the same frequency as the PWM signal. Such operation of the PWM control circuit 124 to generate a primary side periodic signal is generally known. In accordance with the present invention, however, the PWM signal has an on time duty cycle that is adjusted in accordance to a feedback signal generated by the feedback circuit 134, as is discussed further below. The PWM control circuit 124 is preferably also operable to periodically suppress switching on of the switch 122 responsive to the signal from the current sensor 133 as part of the current mode control.

In general, however, the transformer 136 is configured to generate an output periodic signal on the secondary winding 126 having a predetermined relationship to the magnitude of the input circuit. The predetermined relationship is determined in part by the windings ratio between the primary winding 120 and the secondary winding 126. The output periodic signal from the secondary winding 126 is converted to a DC signal by the diode 128 and the output capacitor 130. The DC signal constitutes the DC output signal of the power supply 102. The DC output signal passes through the current measurement circuit 132 to the load 110.

The current measurement circuit 132 generates a current measurement signal that is representative of the magnitude of the current of DC output signal (i.e. the output current). The feedback circuit 134 receives the current measurement signal and generates a feedback signal that is dependent on the current measurement signal. As discussed above, the feedback circuit 134 generates the feedback signal such that it has a piece-wise linear relationship with respect to the current measurement signal (and thus the output current of the power supply 102). In the embodiment described herein, the feedback circuit 134 generates the feedback signal such that it has the voltage shown in the curve 306 of FIG. 3 for the corresponding output current value. In other embodiments, the function need not be a piece-wise linear relationship, but rather may involve one or more non-linear curves.

In the exemplary operation described herein, it is assumed that the initial current is at a level, for example, 1.0 amp. As shown in FIG. 3, the curve 306 has a point 308 corresponding to an output current of 1.0 amp. The point 308 corresponds to a feedback signal having a level 3.0 V. If the current increases slightly, such that it is still below the threshold $I_T$, then the feedback circuit 134 increases the feedback signal level slightly in accordance with the shallow sloped portion of the curve 306. For example, assume that the output current increases to 1.2 amps. As shown in FIG. 3, the curve 306 has a point 310, which corresponds to an output current of 1.2 amps and a feedback voltage level of 3.1 V, which is only slightly higher than the voltage $V_A$. If the current increases past the threshold $I_T$, however, then the feedback circuit 134 increases the feedback signal to a larger extent in accordance with the steeply sloped portion of the curve 306. For example, if the output current increases to 1.8 amps, then the feedback signal increases significantly as illustrated in FIG. 3.

Thus, the feedback signal has a magnitude that increases, albeit at different rates, as a function of the output current. The feedback circuit 134 provides the feedback signal to the PWM control circuit 124. The PWM control circuit 124 uses the feedback signal to adjust the duty cycle of the PWM signal, as discussed above. In particular, the PWM control circuit 124 generates the duty cycle to have an inverse relationship with the feedback signal. Thus, as the feedback signal level increases, the duty cycle decreases. As the duty cycle decreases, the output voltage produced by the power supply 102 will decrease. Conversely, as the feedback signal level decreases, the duty cycle of the PWM signal and the power supply output voltage increases.

Figure 4:
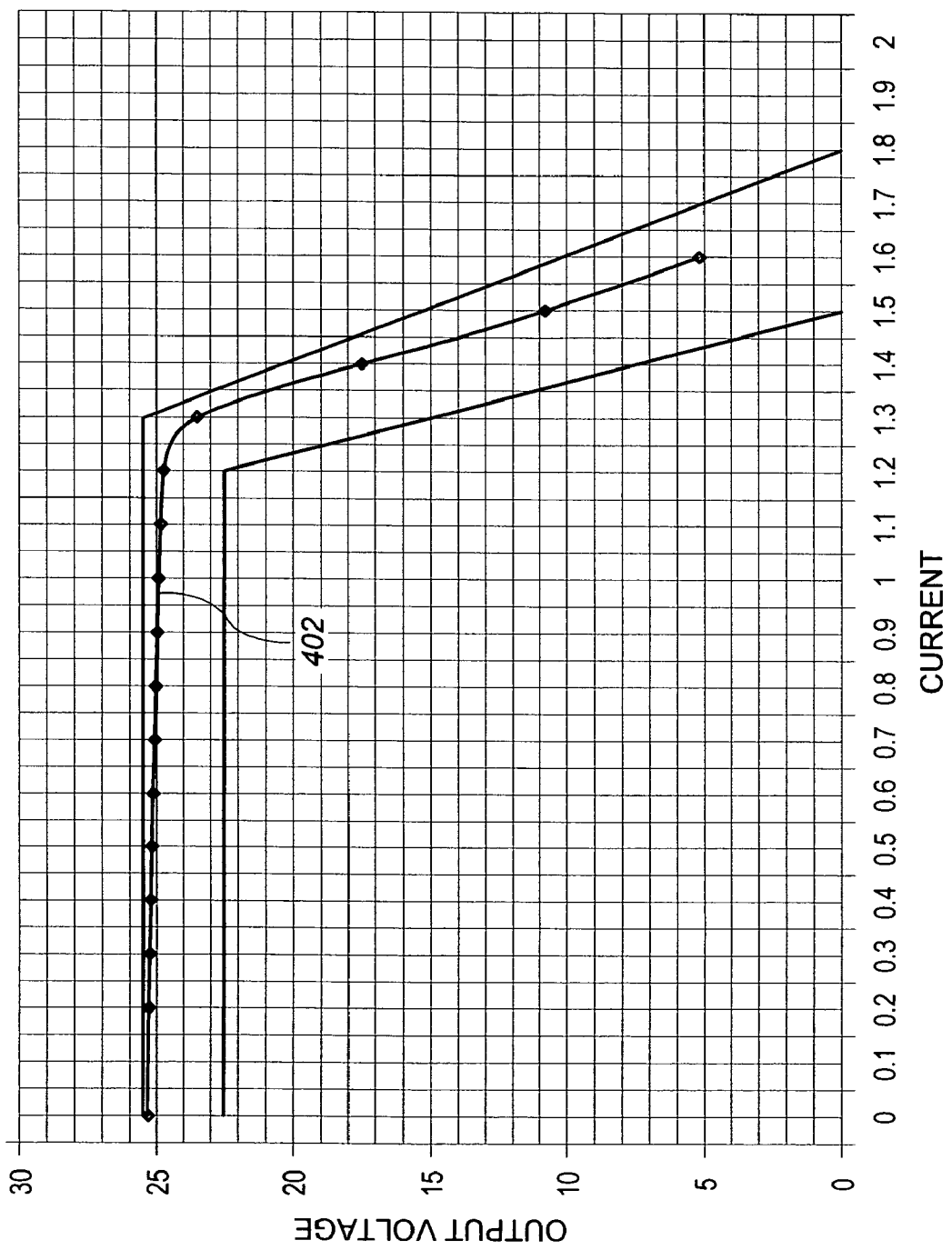
FIG. 4 shows an output voltage vs. output current curve produced by the arrangements of FIGS. 1 and 2.

FIG. 4 shows an exemplary voltage-current graph for the power supply 102. The curve 402 shows the relationship between output current and output voltage. As shown in FIG. 4, the curve 402 includes a two-sloped curve corresponding to the two-sloped curve 306 of FIG. 3.

Referring again to FIG. 1, it will be appreciated that feedback signal may in some cases be inverted in the isolation element 138 or in other intermediate devices. Regardless, however, the feedback signal and the PWM circuit 124 should generally be configured such that the output voltage of the power supply 102 decreases as the output current increases, in accordance with the non-linear relationship shown in FIG. 4.

Figure 2:
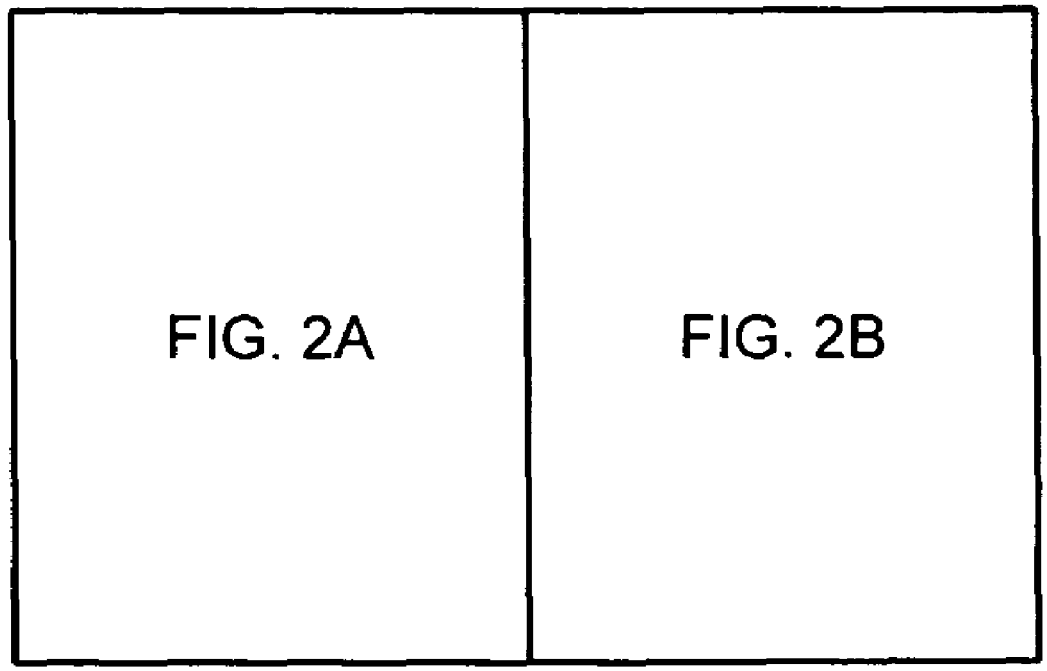
FIG. 2 shows an exemplary arrangement that according to embodiments of the invention that may be used in at least one of the power supplies of FIG. 1.
Figure 2A:
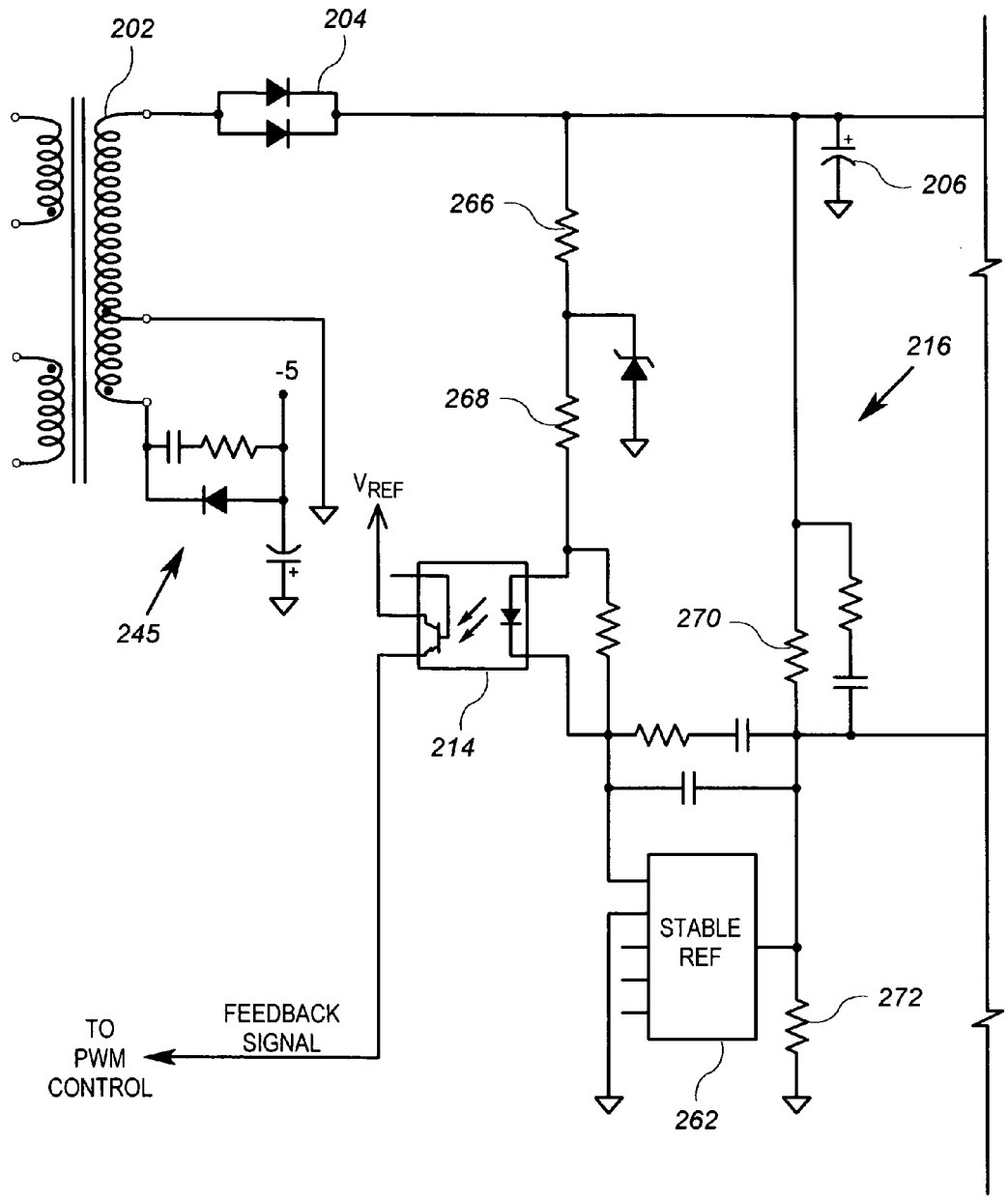
Figure 2B:
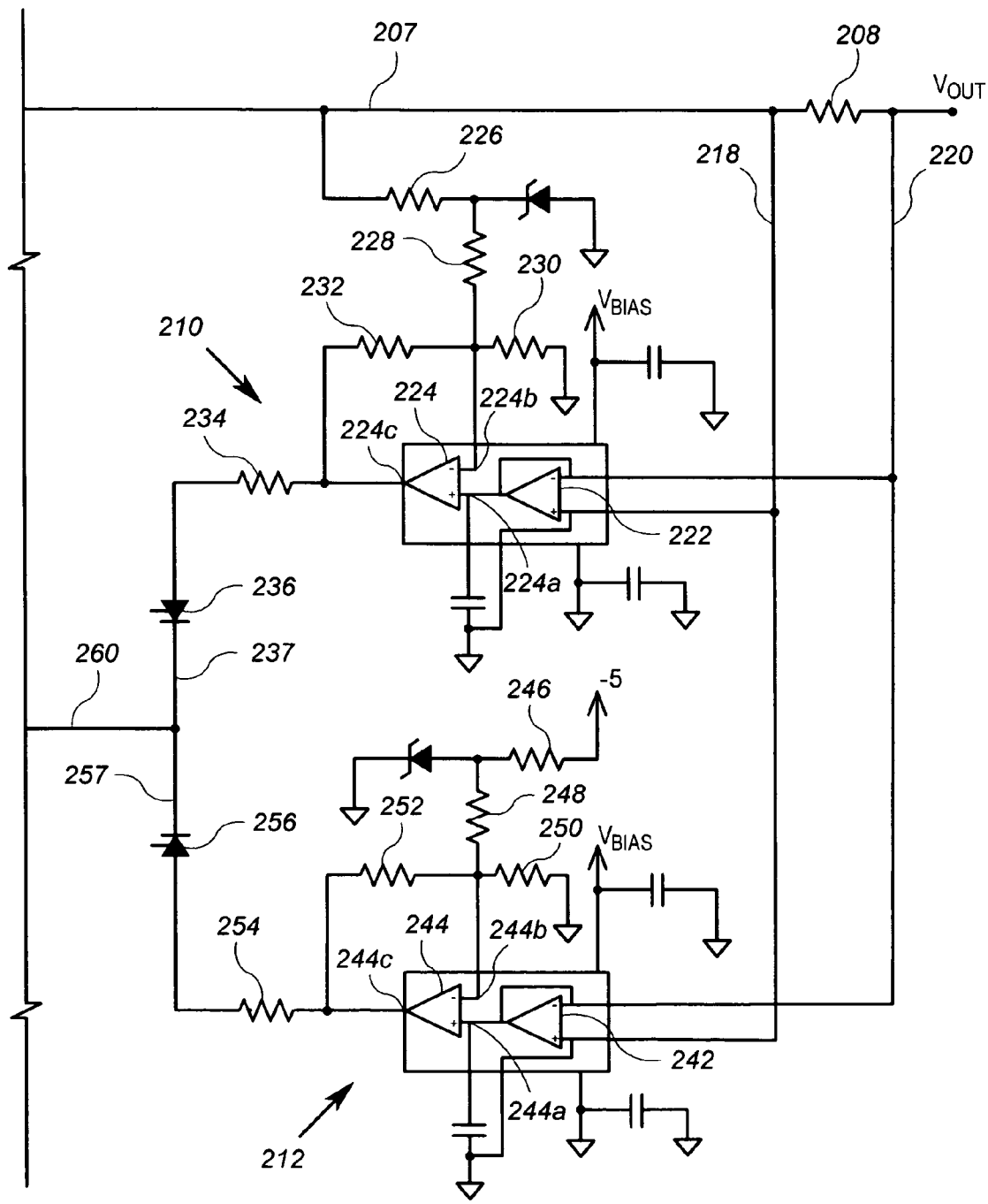

FIG. 2 shows in further detail an exemplary secondary side circuit 200 that may be used as the secondary side circuit 114 of FIG. 1. The secondary side circuit 200 includes a secondary winding 202, a diode pair 204, a smoothing capacitor 206, a series measurement resistor 208, first and second feedback circuits 210 and 212, an isolation device 214 and a biasing circuit 216. The secondary winding 202 is a secondary winding of a switching power supply transformer, such as the winding 126 of the transformer 136 of FIG. 1. The diode pair 204 may alternatively be a single diode, but in any event is the rectifying device of the secondary side of switching power supply similar to the diode 128 of FIG. 1. The capacitor 206 may be configured as one or multiple parallel capacitors. Those of ordinary skill in the art may readily substitute one or more parallel or series elements as is warranted by specific purchasing and packaging strategies and circumstances.

The current measurement resistor 208 is typically a low resistance device, for example, 0.1 ohm, which is coupled in series with the diode 204 and downstream of (i.e. closer to the output than) the capacitor 206. The secondary side circuit 200 further includes a first connection line 218 coupled to a first end of the resistor 208 and a second connection line 220 connected to a second end of the resistor 208. As a consequence, the voltage differential between the first connection line 218 and the second connection line 220 is representative of the output current flowing through the resistor 208. Together, the resistor 208, the first connection line 218 and the second connection line 220 constitute a current measurement circuit that may be used as the current measurement circuit 132 of FIG. 1. As will be discussed in further detail below, the first connection line 218 and the second connection line 220 are coupled to provide the differential current measurement signal to each of the first and second feedback circuits 210 and 212.

The first feedback circuit 210 includes a first differential amplifier 222, a second differential amplifier 224, two input resistors 226, 228, a bias point resistor 230, a feedback resistor 232, and an output resistor 234. Those elements are configured such that the first differential amplifier generates an output signal that includes a steeply sloped response curve to the differential current measurement signal received from the first and second connection lines 218 and 220. However, that steeply sloped response curve has a y-intercept (where measurement signal corresponds to I=0) that is below zero. (See curve 302 of FIG. 3).

To this end, the first differential amplifier 222 has differential inputs connected to the first and second connection lines 218 and 220. The second differential amplifier 224 has a positive input 224a coupled to the output of the first differential amplifier 222. The negative input 224b of the second differential amplifier 224 is coupled to receive a first bias voltage derived from the output voltage of the capacitor 206 (i.e. the DC output line 207 of the secondary side circuit 200). In particular, the negative input 224b of the second differential amplifier is coupled to the DC output line 207 via the resistors 226 and 228. The resistors 226 and 228 may suitably be 10 K ohm and 68.1 K ohms, respectively, when the output voltage is 24 volts DC. The resistor 230, which may suitably be 100 ohms, is coupled between the negative input 224b and ground. The feedback resistor 232, which may suitably be 30.1 K ohms, is coupled between the negative input 224b and the output 224c of the second differential amplifier 224. The output 224c of the differential amplifier 224 is connected to the output resistor 234. The other end of the resistor 234 forms the output 237 of the first feedback circuit 236. The output resistor 234 have a resistance of 2K ohms in the embodiment described herein.

The output 237 is connected to a wired-or circuit formed by diodes 236 and 256. The diodes 236 and 256 are coupled to a common terminal 260 which represents the output of the wired-or circuit. More specifically, the diode 236 is forward biased from the output 237 to the common terminal 260. Similarly, the diode 256 is forward biased from an output 257 of the second feedback circuit 212 to the common terminal 260.

The second feedback circuit 212 includes a differential amplifier 242, a second differential amplifier 244, two input resistors 246, 248, a bias point resistor 250, a feedback resistor 252, and an output resistor 254. Those elements are configured to generate an output signal that includes a shallow sloped response curve with respect to the differential current measurement received from the first and second connection lines 218 and 220.

To this end, the first differential amplifier 242 has differential inputs connected to the first and second connection lines 218 and 220. The second differential amplifier 244 has a positive input 244a coupled to the output of the first differential amplifier 242. The negative input 244b of the second differential amplifier 244 is coupled to receive a first bias voltage derived from a negative bias voltage, for example 5 volts. The negative 5 volts DC may be derived from an auxiliary winding on the transformer and associated biasing circuit, shown generally as 245.

The negative input 244b of the second differential amplifier 244 is coupled to the −5 volt bias via the resistors 246 and 248. The resistors 246 and 248 may suitably be 1 K ohm and 11 K ohms, respectively, when the bias voltage is −5 volts DC. The resistor 250, which may suitably be 576 ohms, is coupled between the negative input 244b and ground. The feedback resistor 252, which may suitably be 10 K ohms, is coupled between the negative input 244b and the output 244c of the second differential amplifier 244. The output 244c of the differential amplifier 244 is also connected to the output resistor 254. The other end of the resistor 254 forms the output 257 of the second feedback circuit 212. The output 257 is connected to the diode 256 of the wired-or circuit as described further above.

As also discussed above, the outputs 237 and 257 of the wired-or circuit are coupled to a common terminal 260. The common terminal 260 is then coupled to the biasing circuit 216. In general, the biasing circuit 216 cooperates with the optocoupler 214 to generate the isolated version of the feedback signal, which is provided to a PWM control device, not shown, but which may be the PWM control circuit 124 of FIG. 1. The biasing circuit effectively includes a stable reference device 262 which is connected to the common terminal 260. The output of the stable reference device 262 is coupled to one input of the optocoupler 214. The other input to the optocoupler 214 is connected, via two resistors 264 and 266, to the output line 207. The common terminal 260 is further coupled through a first bias resistor 270 to the output line 207 and through a second bias resistor 272 to ground.

The bias resistors 270 and 272 establish the bias point of the feedback signal for the outputs of the feedback circuits 210 and 212. More specifically, the bias resistors 270 and 272 set the effective feedback signal level for situations in which the output current of the secondary side is zero. This also provides a voltage feedback element to feedback signal. The voltage divider formed by the resistors 270 and 272 form the initial threshold over which the output of the feedback circuits 210 and 212 must exceed in order to forward bias the diodes 236 and 256, respectively.

In operation, the secondary side circuit 200 of FIG. 2 operates to convert the high frequency signal present on the secondary winding 202 to a DC output voltage on the output line 207. The output line 207 may provide the DC output voltage to a load, not shown, via the current measurement resistor 208. The diode pair 204 and capacitor 206 cooperate to transform the high frequency power signal to the DC output signal. The DC output signal, in the exemplary embodiment described herein has a voltage of 24 volts DC and a current that depends primarily on the load. In accordance with aspects of the invention, the secondary side circuit 200 also provides a feedback signal that may be used to adjust the output voltage of the circuit as a function of the output current on line 207.

In particular, the output current flows through the resistor 208, creating a small voltage drop between the first connection line 218 and the second connection line 220. In the first feedback circuit 210, the differential voltage between the first connection line 218 and 220 is amplified by the first differential amplifier 222 and then provided to the second differential amplifier 224. The second differential amplifier 224 compares the amplified voltage, which is representative of the output current, to a first reference voltage. The second differential amplifier 224 receives the first reference voltage at its negative input 224b. The reference voltage is derived from the output line, adjusted by the configuration of the resistors 226, 228, and 230, as well as by the feedback resistor 232. Because the reference voltage on the negative input 224b will, for low currents, exceed that of the amplified voltage representative of the output current on the positive input 224a, the output 224c of the second differential amplifier will be below zero, as illustrated by the first part of the curve 302 of FIG. 3. As this negative voltage propagates through the output resistor 234 to the diode 236, it is insufficient to turn on, or forward bias, the diode 236. Moreover, as long as the output voltage of the second feedback circuit 212 exceeds the output voltage of the first feedback circuit 210, the diode 236 will not turn on again because there is an insufficient voltage drop over the diode 236. This characteristic may be observed by comparing the overall feedback signal curve 306 with the output curve 302 of the first feedback circuit 210 in FIG. 3. As a consequence, for low currents, the voltage contribution of the first feedback circuit 210 to the overall feedback signal present at the common terminal 260 is zero volts.

However, when the output current is relatively high, the amplified voltage generated by the first differential amplifier 222 will exceed the reference voltage on the negative input 224b. As a consequence, the output 237 of the first feedback circuit 210 will be above the threshold voltage established by the second feedback circuit and/or the biasing circuit 216, as illustrated by the curve 302 of FIG. 3. If the voltage at the output 237 is higher than the output voltage of the second feedback circuit 212 by an amount sufficient to exceed the turn-on threshold of the diode 236, the voltage contribution of the first feedback circuit 210 to the overall feedback signal at the common terminal 260 becomes positive, as shown by the curves 302 and 306 of FIG. 3 when the output current >$I_T$. The resistors 232 and 230 are chosen such that the slope of the output 224b is relatively steep.

The second feedback circuit 212 operates contemporaneously with the first feedback circuit 210. The second feedback circuit 212 also receives the differential voltage from the first and second connection lines 218 and 220. In the second feedback circuit 212, the differential voltage on the first and second connection lines 218 and 220 is amplified by the first differential amplifier 242 and then provided to the second differential amplifier 244. The second differential amplifier 244 compares the amplified voltage, which is representative of the output current, to a second reference voltage. The second differential amplifier 244 receives the second reference voltage at its negative input 244b. The reference voltage is derived from the −5 volt bias voltage, adjusted by the configuration of the resistors 246, 248, and 250, as well as by the feedback resistor 252. Because the reference voltage on the negative input 244b is negative, it will always be exceeded by the amplified voltage representative of the output current on the positive input 224a. Thus, the output 244c of the second differential amplifier 244 (and hence the circuit output 257) will always be above zero, as illustrated by the curve 304 of FIG. 3. However, the voltage at the output 257 is only sufficient to turn on, or forward bias, the diode 256 to the extent it exceeds the threshold generated by the biasing circuit 216. As shown by the curve 304 of FIG. 3, the resistors 252 and 250 are chosen such that the slope of the output 224b is relatively shallow as compared to the slope of the curve 302.

The output voltages at the outputs 237 and 257 are wire-or'd at the common terminal 260 using the diodes 236 and 256. The output voltage at the common terminal 260 constitutes the feedback signal (i.e. curve 306 of FIG. 3) that is provided, via the isolation device/optocoupler 214 and biasing circuit 216, to the PWM control circuit, not shown in FIG. 2. In a preferred embodiment, the PWM control circuit changes the PWM signal duty cycle proportional to the inverse of the feedback signal.

As a consequence, the output voltage of the overall power supply may be adjusted as a threshold-based function of current. The function consists of a first voltage-current response slope below a threshold, and a second voltage-current response slope above a threshold, as illustrated in FIG. 4. It is noted that the first voltage current response slope is shallow, but nevertheless is non-zero.

It will be appreciated that the above embodiments are merely exemplary, and that those of ordinary skill in the art may readily devise their own implementations and modifications that incorporate the principles of the present invention and fall within the spirit and scope thereof.

For example, it is readily apparent that the voltage function may take other forms, including those with three or more distinct V-I curve segments, as opposed to the two shown in FIG. 4. Moreover, the V-I curve segments need not be sloped lines, but instead one or both may be another function. It will also be appreciated that the circuit used to generate the different V-I curve segments may take other forms, although there are advantages to the illustrated embodiment herein. Other variations, however, may be advantageous in other practical applications.

I claim:

1. An arrangement for use in a switching power supply, comprising:
    an output line operably coupled to an output winding of a transformer, the transformer having a first winding operably connected to a switching device configured to be switched in accordance with a first control signal;
    a current sensing circuit operable to generate a current signal representative of the current on the output line;
    a first feedback circuit operable to generate a first feedback signal dependent upon the current signal;
    a second feedback circuit operable to generate a second feedback signal dependent upon the current signal;
    a feedback line operably coupled to the first feedback circuit and the second feedback circuit, the feedback line operable to provide a current feedback signal to a control circuit, the control circuit operable to generate the first control signal based on the current feedback signal.

2. The arrangement of claim 1, wherein the feedback line is operably coupled to the first feedback circuit via a first diode, and operably coupled to the second feedback circuit via a second diode.

3. The arrangement of claim 1, wherein the feedback line is operably coupled to generate the current feedback signal as substantially an or combination of the first feedback signal and the second feedback signal.

4. The arrangement of claim 3, wherein the first feedback circuit is configured to generate the first feedback signal as a linear function of the current signal.

5. The arrangement of claim 4, wherein the current feedback signal is substantially equal to the second feedback signal when the current signal is below a threshold.

6. The arrangement of claim 1, wherein the current sensing circuit includes a series resistance and first and second signal lines electrically coupled to opposing ends of the series resistance.

7. The arrangement of claim 6, wherein the first feedback circuit includes a first differential amplifier coupled to the first and second signal lines.

8. The arrangement of claim 7, wherein the second feedback circuit includes a second differential amplifier coupled to the first and second signal lines.

9. The arrangement of claim 7, wherein the first feedback circuit further comprises a comparator operably coupled to receive a current measurement signal from the first differential amplifier and configured to generate a comparator signal based on a comparison of the current measurement signal with a first threshold, and wherein the comparator is operably coupled to provide the comparator signal to a diode, the diode connected to the feedback line.

10. An arrangement for use in a switching power supply, comprising:
    an output line operably coupled to an output winding of a transformer, the transformer having a first winding operably connected to a switching device configured to be switched in accordance with a first control signal;
    a current sensing circuit operable to generate a current signal representative of current on the output line;
    a feedback circuit operable to generate a feedback signal as a function of the current on the output line, the feedback signal having a first relationship with respect to the current when the current is below a threshold, and having a second relationship with respect to the current when the current is above the threshold, and wherein the feedback signal is non-zero when the current is above the threshold.

11. The arrangement of claim 10, wherein the first relationship comprises a feedback signal voltage to current relationship having a first slope, and the second relationship comprises a feedback signal voltage to current relationship having a second slope, the second slope steeper than the first slope.

12. The arrangement of claim 10, wherein the feedback circuit is operable to generate the feedback signal as substantially an or combination of a first component and a second component.

13. The arrangement of claim 12, wherein the feedback circuit includes a diode configured to suppress the second component when the current is below the threshold.

14. The arrangement of claim 12, wherein the feedback circuit includes a first comparator and a second comparator, and wherein the first component is generated in part by the first comparator, and wherein the second component is generated in part by the second comparator, the first comparator and the second comparator operably coupled to receive a signal representative of the current.

15. An arrangement, comprising:
    a first power supply configured to generate a first output voltage at a first output; and
    a second power supply configured to generate a second output voltage at a second output, the second output coupled in parallel with the first output, the second power supply including
        a current sensing circuit operable to generate a current signal representative of an output current of the second power supply;
        a feedback circuit operable to generate a feedback signal as a function of the output current, the feedback signal having a first relationship with respect to the output current when the output current is below a threshold, and having a second relationship with respect to the output current when the output current is above the threshold, and wherein the feedback signal is non-zero when the current is above the threshold.

16. A method for use in a switching power supply, comprising:
   a) generating a current signal representative of current on an output line of a switching converter circuit;
   b) generating a feedback signal as a function of the current on the output line, the feedback signal having a first relationship with respect to the current when the current is below a threshold, and having a second relationship with respect to the current when the current is above the threshold, wherein the feedback signal is non-zero when the current is above the threshold; and
   c) using the feedback signal to adjust an operation of the switching converter circuit.

17. The method of claim 16, wherein step c) further comprises using the feedback signal to adjust the output voltage of the switching converter.

18. The method of claim 16, further comprising a step of first connecting the output line to a load and to an output line of another switching converter.

19. The method of claim 16, wherein step c) further comprises providing the feedback signal to a pulse width modulation control circuit of a switching converter.

20. The method of claim 19, wherein step c) further comprises providing the feedback signal to the pulse width modulation control circuit through an isolation device.

* * * * *